(No Model.)
R. GREGG.
DUMPING SLED.
No. 388,192. Patented Aug. 21, 1888.
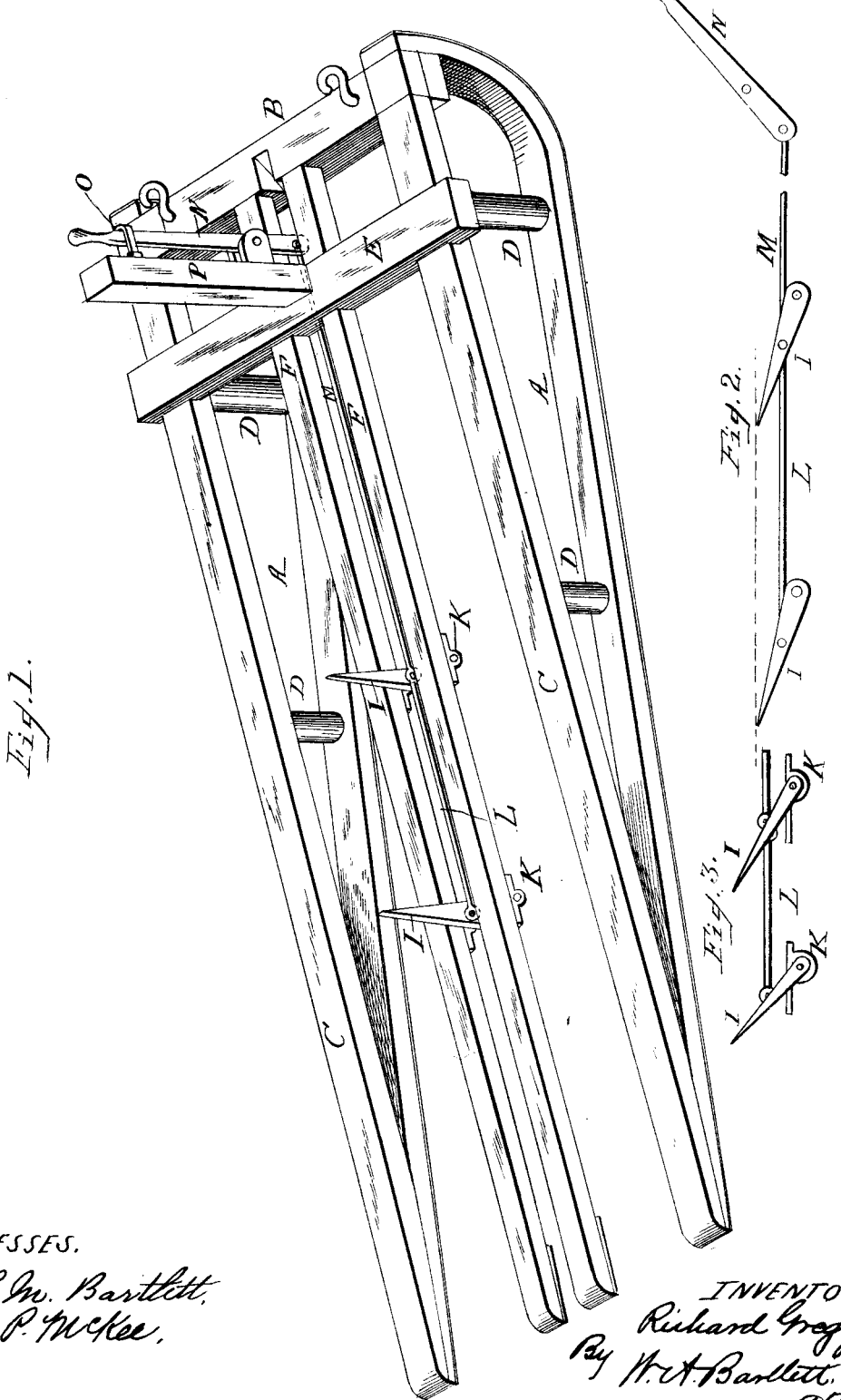
WITNESSES.
L. M. Bartlett,
M. P. McKee,
INVENTOR.
Richard Gregg.
By W. A. Bartlett,
atty.

UNITED STATES PATENT OFFICE.

RICHARD GREGG, OF AURORA, INDIANA.

DUMPING-SLED.

SPECIFICATION forming part of Letters Patent No. 388,192, dated August 21, 1888.

Application filed May 7, 1888. Serial No. 273,085. (No model.)

*To all whom it may concern:*

Be it known that I, RICHARD GREGG, residing at Aurora, in the county of Dearborn and State of Indiana, have invented certain new and useful Improvements in Dumping-Sleds, of which the following is a specification, reference being had therein to the accompanying drawings.

This invention relates to self-dumping sleds, especially intended for use in gathering hay from windrows into cocks, but capable of other uses.

The invention consists in the construction and combination of parts constituting the device.

In the drawings, Figure 1 is a perspective of the sled or sledge and the holding-teeth and moving-lever and links. Fig. 2 is a detail side elevation of the teeth, links, and lever. Fig. 3 is a modified detail showing teeth and link.

A A indicate the runners of a sled or sledge. These runners are connected at the front above the bend by a cross-bar, B. Each runner has an incline-plate, C, leading from the top of the bend to the rear of the runner, said plate being supported by suitable knees or braces, D. The plates C C are connected at the front by the cross-bar B, and also at a little distance in rear thereof by a cross-bar, E.

As many longitudinal string-pieces F F as may be desired are placed between the runners, extending back from the cross bar B to the rear of the sled. In general two of these string-pieces will be enough for a hay-sled, and one may be sufficient. These pieces F are parallel with plates C C, and form with said plates an inclined open platform. The rear ends of the string-pieces will rest on the ground, and may be shod with iron, if desired. Generally wooden shoes will be preferred for the sled.

The inclined platform, consisting of the plates and string-pieces, is unobstructed by cross-bars from the bar E to the rear of the sled, this part of the sled being the part which receives the load.

A number of teeth, I, are pivoted to one or more of the string-pieces F. I have shown these teeth pivoted to hangers K on the string-pieces, so that the teeth are between these pieces. The teeth I are connected together by a link, L, pivotally connected to the teeth or to lugs or pins on the teeth. The front tooth, I, is connected by a draw-bar, M, with a lever, N, which is pivoted near the front of the sled, and is retained in upright position by catch O on standard P. When the lever is held by this catch, the draw rod or bar M and link L will retain the teeth I I in upright position. When the lever is released, these teeth may turn down, as in Figs. 2 and 3.

For gathering hay into cocks the sled is drawn along a windrow and the hay is thrown on, being retained by the teeth I. A hay-cock of any desired size is built on the sled. When the hay-cock is complete, the lever N is operated to turn back teeth I, and the hay-cock will slide from the rear of the sled and rest on the ground in a perfect shape. The sled need not be stopped at all in loading and unloading, as two men can throw the hay of a windrow on the sled as fast as a team will ordinarily walk, and the sled will move out from under the load as soon as the teeth are turned back.

The same sled may be used in drawing brush, cord-wood, and similar material on a farm, the self-dumping property making it very useful. By binding the load with cords or chains the teeth may be omitted.

As the sled is made quite low, it is easy to load, the hay or other material used in loading being lifted but a little way. Logs, &c., may be rolled onto the rear end of the sled which could not be rolled up a skid into a wagon without a much greater expenditure of power. There should be no side projections on the sled to obstruct the loading. A sled with broad runners will move over the stubble of a mowed field very easily. My sled has been used in the hay-field and found to give excellent satisfaction.

What I claim is—

1. The combination, in a sled, of runners having plates inclined from above the bend at the front to nearly the level of the ground at the rear, cross-bars at the front connecting said runners, and intermediate string-pieces inclined from front to rear, the rear ends of said pieces resting on the ground, substantially as described.

2. The combination, with a sled having an upper platform inclined from front to rear, of movable teeth extending above the surface of said platform when turned up, and a holder to retain said teeth in upright position.

3. In a farm-sled, the combination of the runners, an inclined platform consisting of longitudinal bars to support the load, pivoted teeth extending above the platform when turned up, connecting links and rods, as described, and a lever connected to said rods by which the teeth may be manipulated, as set forth.

In testimony whereof I affix my signature in presence of two witnesses.

RICHARD GREGG.

Witnesses:
W. A. BARTLETT,
SCHUYLER DURYEE.